March 3, 1959  A. W. WEEMS  2,875,799
MACHINE FOR BREAKING NUT MEATS
Filed July 24, 1957
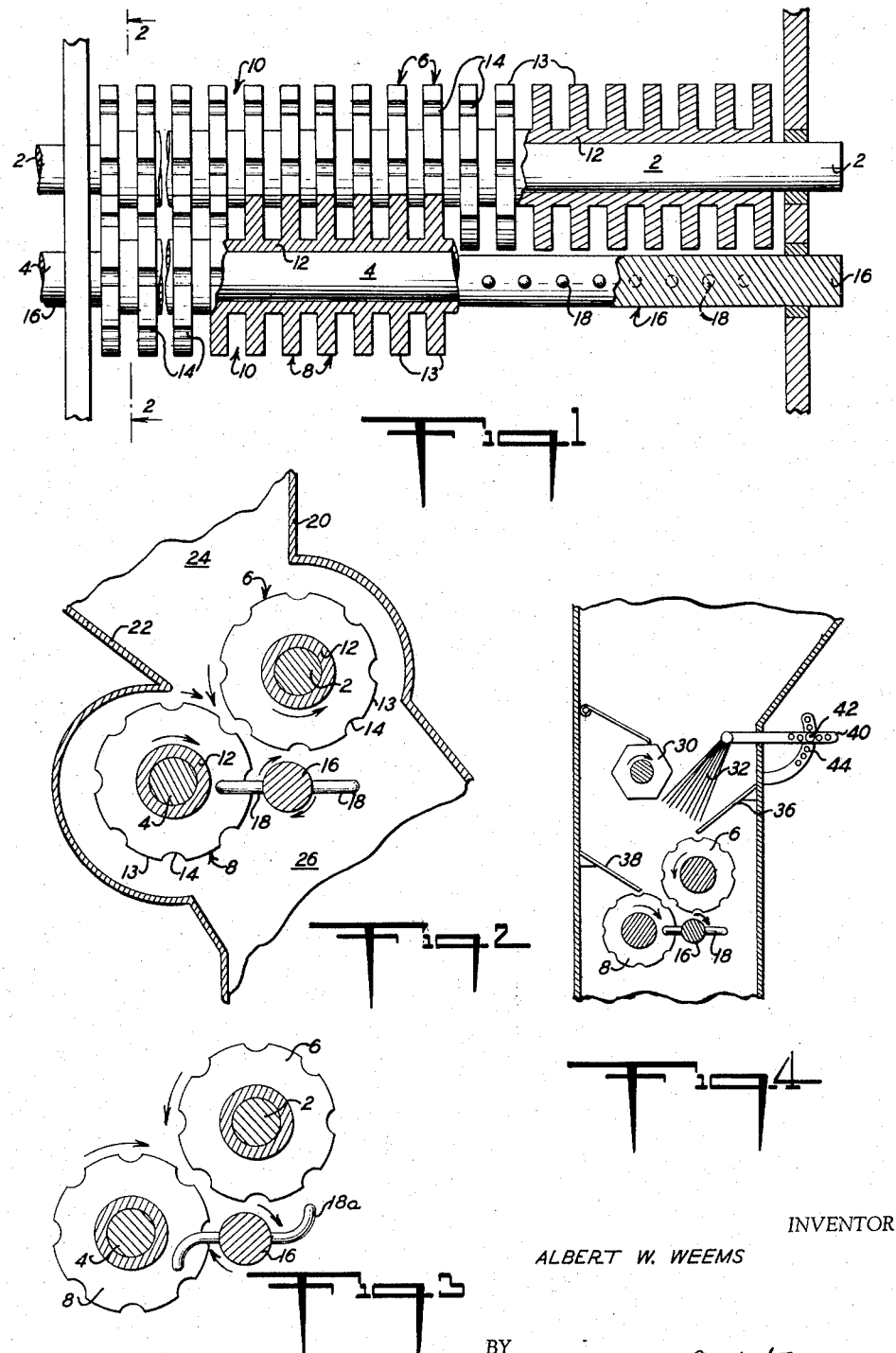
INVENTOR
ALBERT W. WEEMS
BY
ATTORNEYS

United States Patent Office 2,875,799
Patented Mar. 3, 1959

2,875,799

MACHINE FOR BREAKING NUT MEATS

Albert Williams Weems, Meridian, Miss.

Application July 24, 1957, Serial No. 673,810

9 Claims. (Cl. 146—123)

This invention is a machine for breaking nut meats, particularly halves of pecan nuts, almonds, etc.

The principal object of the invention is to provide a machine for breaking nut meats cleanly and with the formation of a minimum amount of waste meal.

Another object of the invention is to provide a machine in which the nut is broken so that as little of its valuable flavoring oil as possible is lost.

The invention comprises essentially a pair of parallel shafts, arranged to rotate in opposite directions. These shafts are provided at regularly spaced intervals with transverse disks of substantial thickness, made of some resilient material such as rubber, for example, or of metal. The peripheral surfaces of these disks are preferably provided with corrugations, for better gripping the nut meats.

The described disks are spaced apart, preferably equally along their respective shafts, so that the disks on the two shafts and the spaces between the disks are in respective transverse alignment.

Co-operating with the disks just described is a third rotatable shaft parallel to the first two shafts provided with radially extending breaker tines, positioned to travel between the disks and to hit and break nut meats gripped between the disks.

Referring to the accompanying drawings illustrating the invention in more detail:

Fig. 1 is a transverse vertical section through the nut meat breaker of the present invention.

Fig. 2 is a side view, partly in section, of the movable parts of the nut meat breaker.

Fig. 3 is a cross section showing a modification.

Fig. 4 is a cross section showing another modification.

Referring now to these drawings, the shafts 2 and 4 are mounted in suitable bearings and arranged to rotate in opposite directions, as indicated by the arrows, one shaft, such as 2, being at a slightly higher elevation than shaft 4.

Spaced along the shafts 2 and 4 is a plurality of disks 6 and 8, these disks being of substantial thickness as shown in Fig. 2, and spaced along their respective shafts 2 and 4 at regular intervals, thereby providing spaces 10 between the disks. These disks may be made of metal or of resilient material, such as rubber, or some may be metal and some of the resilient material. As shown in Fig. 1, the disks 6 and 8 may be formed integrally with a cylindrical bushing 12 and secured to and rotatable with shafts 2 and 4.

As is evident in Fig. 1, the disks 6 and 8 are arranged in transversely aligned pairs and it should also be noted that the spaces 10 between the disks are also in respective transverse alignment.

The outer peripheral surfaces 13 of the several disks may be provided with corrugations 14 for aiding in gripping the nut meat.

Co-operating with the parts just described is a third shaft 16 arranged to rotate preferably clockwise, this shaft being provided with radially extending tines 18, of a length and so positioned as to project into the spaces 10 between the several disks.

The breaker tines 18, instead of being straight, as in Fig. 2, may be of other shapes, as for example, curved as shown as at 18a in Fig. 3. Their function, as noted, is to project between the disks 6 and 8 and to break nut meats held by the disks. The nut meats tend to break along natural lines of cleavage, with a minimum rupture of the oil cells, to provide nut meats of high quality.

Fig. 4 shows another way of guiding the nut meats to the breaking disks, comprising a rotatable hexagonal roller 30, a co-operating brush 32 and guide plates 36 and 38; brush 32 is variably positionable by an arm 40 and fin 42 co-operating with a perforated rack bar 44.

A suitable housing element with sides 20 and 22 may be provided for guiding the nut meats into and between the rotating disks.

In operation, the nut meats are fed into the space above and gravitate between the disks; if the nut meats are pecan halves, for which this apparatus is particularly designed, or for almonds, for example, the nut meats usually arrange themselves lengthwise; that is parallel to the shafts 2 and 4, and are gripped between aligned disks and while so gripped are hit by tines 18 or 18A and thereby broken, the broken meats falling into the space 26. The shaft 16 carrying the tines 18 or 18A rotates considerably faster than the shafts 2 and 4, preferably about 10 times as fast as shafts 2 and 4.

While the invention has been illustrated in some detail, it should be understood that the disclosure is illustrative rather than restrictive of the invention and may be carried out in other ways.

I claim as my invention:

1. A machine for breaking nut meats comprising a pair of substantially parallel shafts adapted to rotate in opposite directions, a plurality of axially spaced disks mounted on said shafts, said disks, and the spaces between said disks, being in respective transverse alinement, and a third rotatable shaft substantially parallel to said first two shafts, provided with breaker tines projecting into the spaces between said disks.

2. The combination of claim 1, wherein said disks are of resilient material.

3. The combination of claim 1, wherein the peripheral surfaces of said disks are provided with corrugations.

4. The combination of claim 1, wherein said third shaft is rotated at a much higher rate of speed than the two disk carrying shafts.

5. The combination of claim 1, wherein said third shaft is rotated at about ten times the speed of the first two shafts.

6. A machine for breaking nut meats, comprising two series of spaced grippers in parallel rows, rotatable in opposite directions for gripping nut meats therebetween, and a plurality of movable breaker tines cooperating with said grippers for striking and breaking nut meats gripped between the two rows of disks.

7. A machine for breaking nut meats, comprising two series of spaced grippers in parallel rows and rotatable in opposite directions for gripping nut meats therebetween, the grippers in each row being in transverse alinement so that the spaces between them are also in transverse alinement, and a plurality of relatively blunt breaker tines cooperating with said grippers and movable in the spaces between the grippers, for striking and breaking nut meats held therebetween.

8. The combination of claim 6, wherein the peripheral surfaces of said grippers are provided with corrugations for gripping nut meats therebetween.

9. The combination of claim 7, wherein the peripheral surfaces of said grippers are provided with corrugations for gripping nut meats therebetween.

References Cited in the file of this patent

UNITED STATES PATENTS

| | | |
|---|---|---|
| 2,001,075 | Sunstrand | May 14, 1935 |
| 2,561,069 | Peterson | July 17, 1951 |
| 2,685,900 | Cross | Aug. 10, 1954 |